April 25, 1961 R. L. ZOUCK ET AL 2,981,350
IN-HOLD CARGO HANDLING DEVICE
Filed July 25, 1958 4 Sheets-Sheet 1

INVENTORS
ROBERT L. ZOUCK
IRWIN R. BARR
BY Thomas J. Holden
ATTORNEY

April 25, 1961  R. L. ZOUCK ET AL  2,981,350
IN-HOLD CARGO HANDLING DEVICE
Filed July 25, 1958  4 Sheets-Sheet 2

April 25, 1961 R. L. ZOUCK ET AL 2,981,350
IN-HOLD CARGO HANDLING DEVICE
Filed July 25, 1958 4 Sheets-Sheet 3

6-6

April 25, 1961 R. L. ZOUCK ET AL 2,981,350
IN-HOLD CARGO HANDLING DEVICE
Filed July 25, 1958 4 Sheets-Sheet 4

10-10

United States Patent Office 2,981,350
Patented Apr. 25, 1961

2,981,350

IN-HOLD CARGO HANDLING DEVICE

Robert L. Zouck, Ruxton, and Irwin R. Barr, Kingsville, Md., assignors to Aircraft Armaments, Inc., Cockeysville, Md., a corporation of Maryland Filed July 25, 1958, Ser. No. 750,999

7 Claims. (Cl. 180—9.2)

This invention relates to a device for handling skids, and more particularly to a device of a class especially adapted for use in quickly moving heavy cargo in a ship's hold.

The need for a device of the particular class arises from an attempt to increase the loading rate of general cargo aboard ship and to more efficiently utilize hold space, by packaging such cargo in standard size containers thereby presenting to a ship, a cargo composed of identical units instead of a hodge-podge of miscellaneous shapes and sizes. A standard container or module in current use is a box-like steel shell about six feet by seven feet in cross-section and about eight feet high, supported on skids providing about five to six inches clearance beneath the floor. The gross weight is generally about eleven thousand pounds. At dockside, modules may be conveniently handled by conventional devices, such as fork lift trucks or the like, which place the modules in position to be picked up by the ship's hoist and deposited thereby on the hatch cover of the deck into which the module is to be stored. Such hatch covers are merely three by ten wooden planks assembled in units of three over beams placed on five foot centers across a hatch opening. Thus, any device used to move a module off a hatch cover for stowage cannot impose a load on the latter which will exceed its elastic limit.

Conventional fork lift trucks are not suitable for in-hold handling of heavy modules because their suspension and elevation system is such that (1) the two front wheels carry all of the load weight plus most of the vehicle weight, thereby imposing a force concentration which exceeds the elastic limit of the hatch cover, and (2) the wheel base necessary to insure stability of the vehicle limits the turning radius and maneuverability thereby significantly slowing the rate of stowage of modules into the particular pattern which is necessary for optimum utilization of hold space.

Conventional pallet trucks are not suitable because their suspension and elevation system is such that (1) the lifting wheels being small enough to fit beneath a module are heavily loaded thereby causing the expenditure of excessive tractive effort in moving them over small obstacles generally found in ship's holds, and (2) the lifting wheels being rigidly connected to the elevating system cause the entire load to be lifted to the height of the obstacle during the negotiation thereof thereby requiring extra work effort and causing the load to tend to shift. The power requirements become an important factor when it is considered that the power source is generally batteries.

Much effort has been expended to contribute an in-hold cargo handling device capable of quickly moving heavy loads in which the suspension and elevation system will not hinder the movement of the device in the manner set forth, but so far as is known, no successful device of the class described has yet been contributed to the art, and the problems here outlined remained unsolved. It is the object of this invention to contribute a device of the class described, and of small dimensions to fit beneath a heavy load in which no real impediment will be presented against movement of the loaded device over a ship's hatch cover or over a surface containing small obstacles and depressions.

As a feature of the invention whereby the objects thereof are obtained, an exceedingly novel suspension and elevation system is utilized which includes powered endless tracks to distribute the weight and provide for ease in negotiating obstacles, and selectively actuatable bogie wheels to control elevation of the device.

As a further feature of the invention, there is utilized a torsional mounting between the bogie wheels and the means to actuate the same to permit the bogie wheels to deflect as obstacles are encountered for enabling the device to easily pass thereover without tipping or raising the load.

As still a further feature of this invention, variable spring means acting on an idler are utilized to maintain the suspension and elevation system in operative engagement with the track throughout the entire movement of said system.

By actual trial, a device constructed in accordance with this invention will, when fully loaded, pass over a simulated hatch cover and over a rough surface, or a surface having obstacles or depressions thereon, without presenting the extreme difficulties of the prior art devices.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 2:
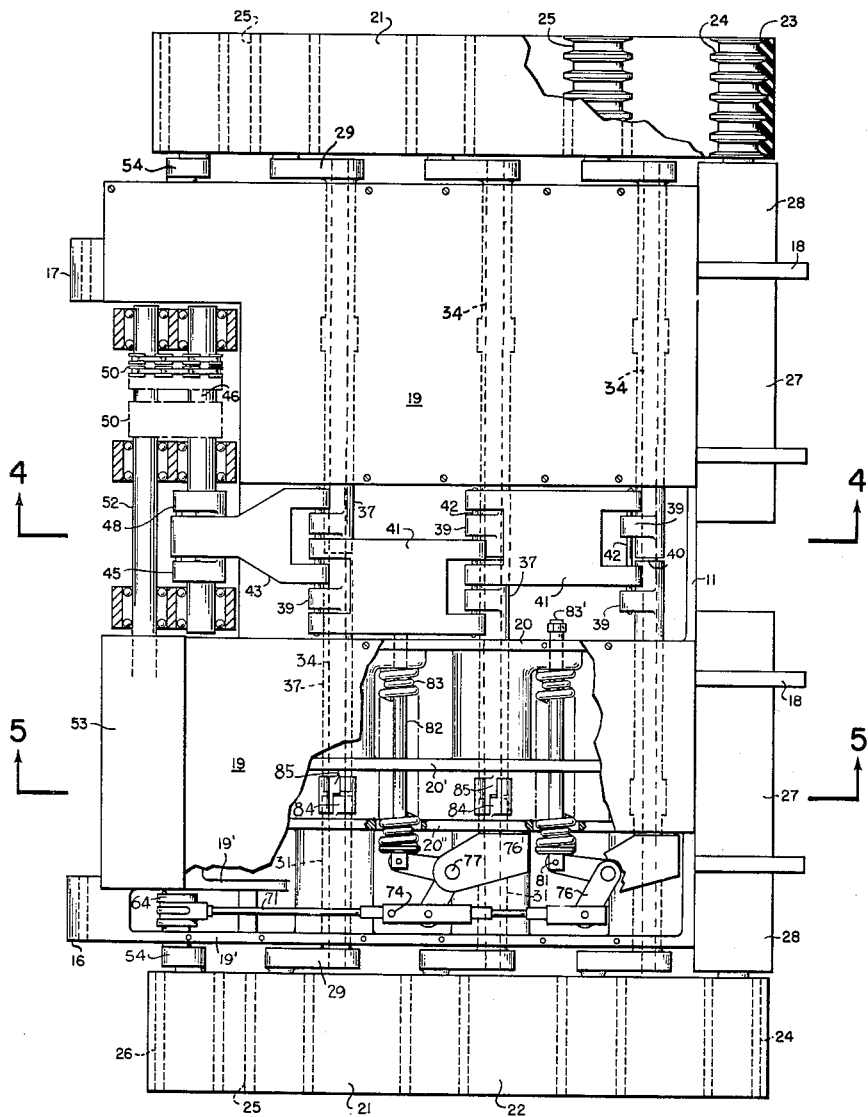
Figure 2 is a plan view of a single truck with various parts removed and shown in section to more clearly show the suspension and elevation system.

Referring now more particularly to the drawing, the device embodying the invention is shown as a power train 10 made up of individual trucks 11 interconnected by pins 12 to form an articulated joint, with a control unit 13 and battery 14 attached by bar 15 to one truck. Trucks 11 are identical, and as seen in Figure 2, each has an outer ear 16 and an inner ear 17 at one end. In connecting two trucks together, the outer and inner ears of one truck are connected respectively to the inner and outer ears of a second truck by pins 12. Each truck, on the end opposite to that having ears 16, 17 has attaching lugs 18 to which bar 15 may be attached. Such construction facilitates disassembly and shipping of the device.

Each truck 11 has sides 19', load supporting surfaces 19 adapted to engage the under surface of a module, and reinforcing ribs 20 to strengthen the truck and to provide working spaces for the elevation and suspension system which is described below. Endless rubber tracks 21, having an outer abrasion resistant wear surface 22 and an inner wheel engaging surface with a plurality of V-shaped projections 23, to support the truck. A track 21 is mounted on each side of the truck and is engaged over multi-groove traction wheels 24 connected to an electric drive motor 27 on either side of the truck through gear box 28.

By virtue of the fact that bogie wheels 25 are interconnected with traction wheel 24 on each side of truck 11 by track 21, each of wheels 25 is effectively powered. As will be described below, this provision facilitates obstacle climbing. In fact, it is possible to utilize this concept of driving all the ground engaging wheels in a device which does not employ a track like track 21, but uses instead individually powered wheels.

Figure 4:
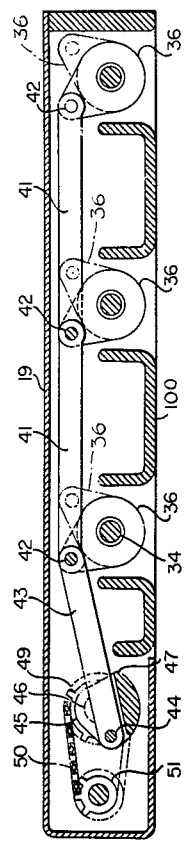
Figure 4 is a view taken along the line 4—4 of Figure 2.

Three bogie wheels are movably mounted on each side 19' of the track. The six wheels are primarily connected into three groups of two wheels each, with each group connected by links so that all three groups move in unison. The two wheels of each group are on opposite sides of the truck, and are rotatably mounted on wheel arms 30 of bogie cranks 29. Cranks 29 are pivoted by hollow arms 31 in bearings 32. Arms 31 of each group are oppositely arranged in alignment, and have splines 33 at the outer ends thereof. A torsion bar 34 is engaged in holes 31' of each group of arms and has splines 35 at its outer ends engaged with splines 33. Each group also has elevator cranks 36 having hollow arms 31 in alignment and engaged over torsion bar 34. At adjacent ends of each arm 37 of a group, there is provided internal splines 38 and a lever arm 39. Splines 38 are engaged with splines 40 on the middle portion of torsion bar 34. Arms 39 of each group are separately interconnected to connector links 41 by pins 42 such that movement of these links causes movement of all bogie wheels 25 in unison. The group adjacent idler wheel 26 has actuator link 43 pivotally connected at one end to arms 39 and pivotally connected by pin 44 to actuator crank 45, which is rigidly attached to countershaft 46. Crank 45 is U-shaped having a base 47 and two ears 48 through which pin 44 extends. As best seen in Figure 4, which shows the position of elevator cranks 36 with the wheels extended in down position, link 43 bears against base 47 and a line connecting the center of pin 44 with the center of the pin 42 that is common to link 43 and ears 39, lies below the center of shaft 46. When bogie wheels 25 are in extended position, a load on surface 19 tends to cause cranks 36 to rotate clockwise as viewed in Fig. 4, but the over center toggle arrangement of crank 45 with link 43 resists such rotation, and locks bogie wheels 25 in extended position.

Spaced from crank 45 on shaft 46 are multiple chain sprockets 49 rigidly connected therewith. Multiple chain strands 50 connect sprockets 49 with sprockets 51 on elevator shaft 52. Electric elevator motor 53 is connected to shaft 52 through a suitable gear box.

Figure 9:
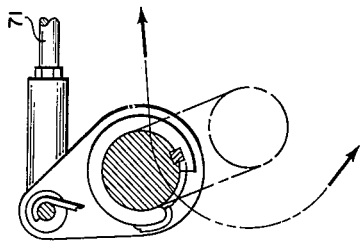
Fig. 9 is a side view similar to Fig. 8 showing the position of the idler crank when the bogie wheel arms are fully extended as shown in Figs. 2 and 3.
Figure 8:
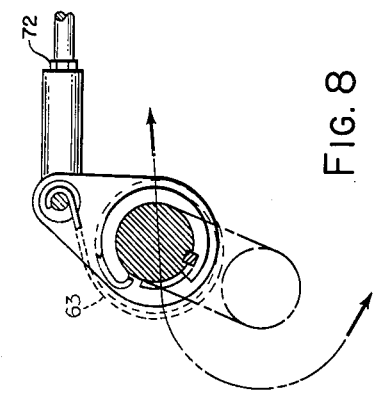
Fig. 8 is a side view of the idler crank arm in an intermediate position occupied when the bogie wheel arms are moved toward extended position.
Figure 7:
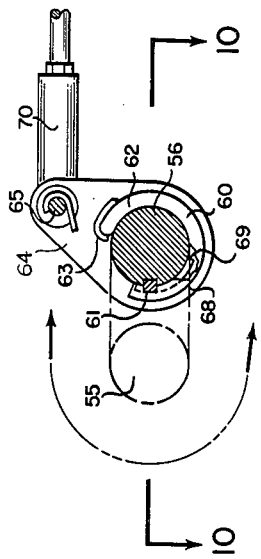
Fig. 7 is a side view of the idler crank arm when the arm is in its retracted position as shown in Fig. 1. The idler wheel and axle have been removed to clarify operation of the crank arm.
Figure 10:
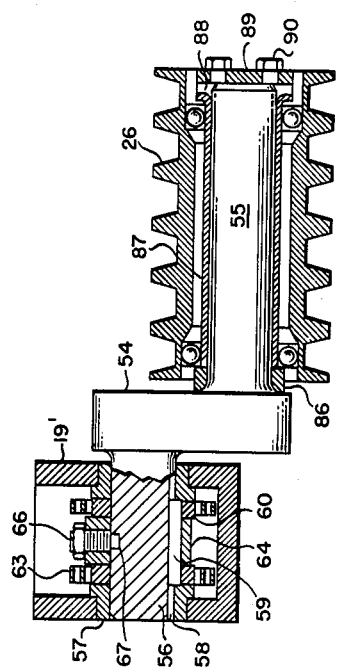
Fig. 10 is a view taken along the line 10—10 of Fig. 3.

Each idler wheel 26, on opposite sides of a truck, is rotatably mounted on idler wheel arm 55 of idler crank 54. Crank 54 is pivotally mounted in bushings 57 in side 19' by idler shaft 56. A keyway 58 is cut into shaft 56 and key 59 inserted therein. Mounted over shaft 56 and adjacent bushings 57, are spring holders 60 having a keyway 61 therein engaged over key 59. By this arrangement, holders 60 are given the same angular movement as experienced by shaft 56. As best seen in Figs. 7, 8 and 9, holders 60 have a spring attaching portion 62 located about 90° from keyway 61. Spiral spring 63 has one end engaged over portion 62 and the other engaged over pin 65 on crank arm 64. Arm 64 is rotatably mounted on shaft 56, and has set screw 66 engaged in circumferential notch 67 in shaft 56 so that as seen in Fig. 10, shaft 56 is retained against axial movement with respect to side 19'. Arm 64 has recess 68 connecting with its bore of a size sufficient to allow key 59 to move therein whereby shaft 56 can move from its position in Fig. 7 to its position in Fig. 8 without imparting any movement to crank arm 64 until key 59 contacts edge 69 on crank arm 64. Thereafter, continued movement of shaft 56 to its position in Fig. 9 imparts the same movement to arm 64. During movement of shaft 56 from its position in Fig. 7 to its position in Fig. 8, spring 63 is twisted and biases arm 55 toward its position in Fig. 7. This bias is maintained at a constant value during subsequent movement of shaft 56 to its position in Fig. 8.

Yoke 70 has one end connected to pin 65 on arm 64 and the other end threaded for connector bar 71. Locknut 72 provides for adjustment. Connector bar 71 has its other end threaded into lug 73 which has a reduced portion pivotally mounted by pin 74 within the spaced leaves of connector 75. Bell crank 76, pivotally mounted on bracket 76' by pivot pin 77, has an upper arm 78 pivotally mounted between the leaves of connector 75 by pin 79, and a lower arm 80 pivotally connected to spring plug 81 which is integral with spring rod 82. Concentric compression springs 83 bear against rib 20, pass through ribs 20' and press against plug 81. Rod 82 extends freely through rib 20 and has locknut 83' thereon to limit movement of bell crank 76.

Figure 5:
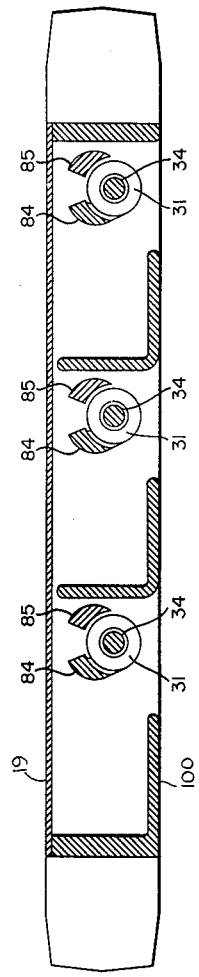
Figure 5 is a view taken along the lines 5—5 of Figure 2.
Figure 6:
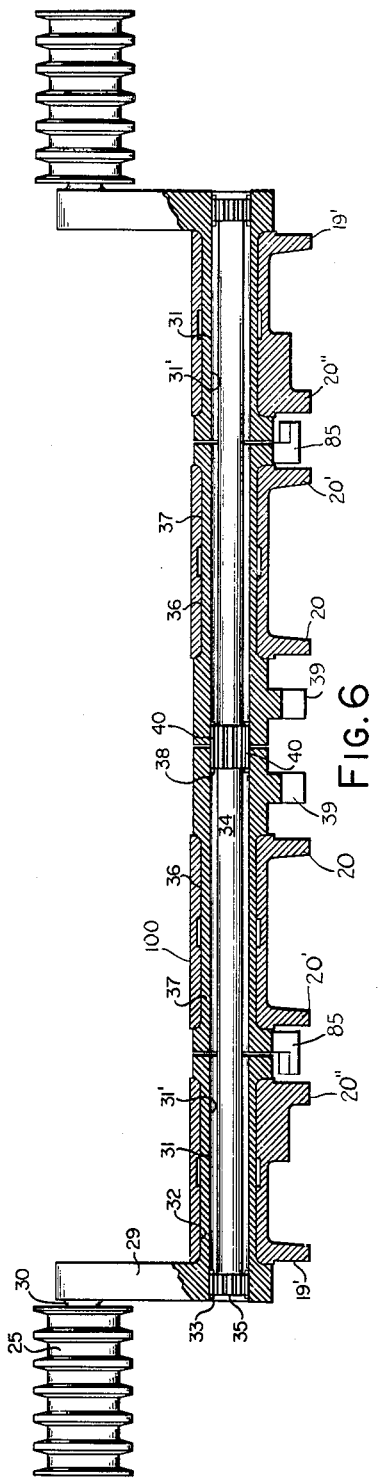
Figure 6 is a view taken along the lines 6—6 of Figure 3.

At the abutting ends of hollow arms 31 and 37, spaced stops are provided as shown in Figs. 2 and 5. Stop 84 is integral with arm 31 and extends into the path of stop 85 which is integral with arm 37. Referring to Fig. 2, stops 84 and 85 are free to rotate in the space between ribs 20' and 20''. Bottom 100 of truck 11 is open between ribs 20' and 20''. Arm 31 is sleeve-like and has one end rigidly attached to wheel arm 29. Arm 37 is also sleeve-like and has one end rigidly attached to crank 39. Arms 31 and 37 are thus separate but resiliently interconnected through their remote ends by virtue of the torsion bar 34. Stop 84 is on the end of arm 31 that is adjacent the end of arm 37, and overlies the latter. Stop 85 is on the end of arm 37 that is adjacent to the end of arm 31, and overlies the latter. When there is no torsional deformation of torsion bar 34, stops 84 and 85 are spaced from each other as shown in Fig. 5. When crank arms 39 are fixed in the position shown in the solid lines of Fig. 4 by the over-center toggle arrangement, wheel arms 29 are in extended position. Torsion bar 34 is thus twisted as wheel 25 on arm 29 encounters an obstacle and as the load on truck 11 is increased. Due to this twisting, or torsional deformation of bar 34, stop 84 is caused to approach stop 85. Eventually, stop 84 will abut stop 85 and limit further torsional deflection of bar 34.

Referring to Fig. 10, there is shown collar 86 mounted on arm 55 adjacent crank 54. Rotatably mounted over arm 55 is an eccentric 87 having tool slot 88 at the free end. Rotatably mounted on eccentric 87 is idler wheel 26. Upon rotation of eccentric 87 about arm 55, the center of rotation of wheel 26 is shifted with respect to the center of rotation of shaft 56. The purpose of this adjustment will be described below, it being sufficient at this point to explain that once adjusted, eccentric 87 is held fixed with respect to arm 55 by plate 89 which is attached there to by screws 90.

In operation, supporting surface 19 is movable between different levels of elevation measured from a ground surface. At the level shown in Fig. 1, surface 19 is about four inches above the ground and is adapted to be passed between the skids of a load L and beneath its undersurface. The suspension and elevation system with trucks 11 in this position has bogie cranks 29 approximately horizontal. When control unit 13 is used to apply power from battery 14 to drive motors 27, traction wheels 24 are caused to rotate and act on tracks 21 so that power train 10 can maneuver with respect to a load L. The inherent ability of a tracked vehicle to execute a turning maneuver in a minimum amount of room is utilized in this invention such that power train 10 can execute a 180° turn about the point formed by the intersection of the center line of the train with joint 12. The turning radius is minimized as a result of suspending control unit 13 and battery 14 from one truck by means of bar 15. However, it is obvious that a separate castered cart could be attached to a truck to carry a control unit and battery or a diesel electric generator unit if necessary. Furthermore, battery 14 could be eliminated and power supplied from an external source through a cable attached to the truck.

Figure 1:
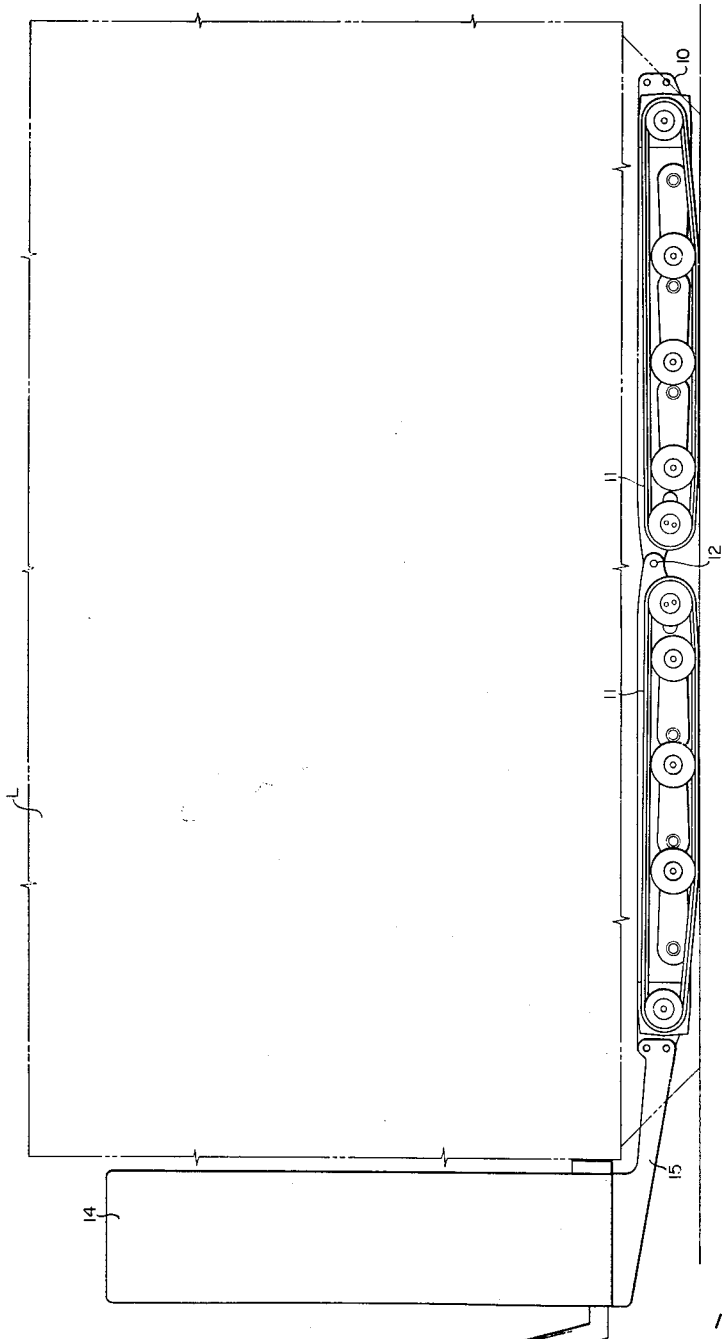
Figure 1 is an elevation of a device of the class described, showing the invention embodied therein, with the device lowered and inserted beneath a load.
Figure 3:
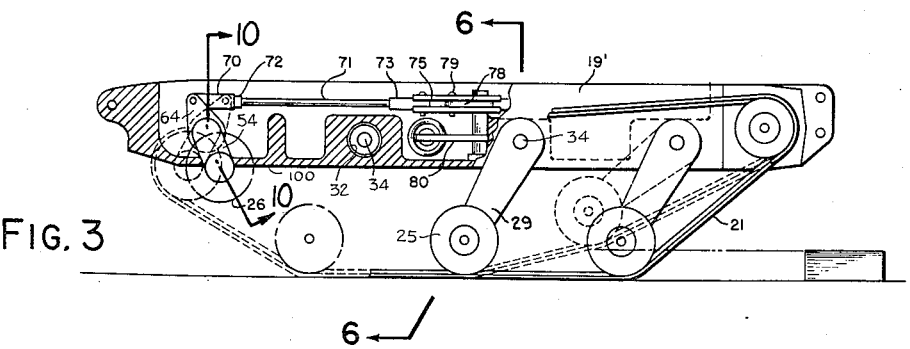
Figure 3 is a side view of the truck of Figure 2 with additional parts removed to more clearly show the idler tensioning system.

After trucks 11 are in position beneath load L, power is applied to elevator motor 53 which causes the bogie cranks 29 on left truck 11 as viewed in Fig. 1 to rotate clockwise and those of the right truck to rotate counterclockwise. By this arrangement, surfaces 19 are caused to move vertically upward without any forward or rearward motion in order to eliminate all relative motion between load L and the trucks except that in a vertical direction. During this elevation, the control unit prevents actuation of drive motors 27. After cranks 29 are inclined as shown in Fig. 3, the skids of load L are off the ground, and power can then be applied to motors 27 to move the load. Lowering is accomplished in the reverse manner.

Consider now the means by which elevation of surface 19 is accomplished. Before power is applied to motor 53, lever arms 39 are in the position shown in broken lines in Fig. 4, and cranks 29 are substantially horizontal as shown in Fig. 1. Upon rotation of shaft 52, actuator crank 45 through multiple chains 50 is caused to move to the over center position shown in Fig. 4. Such movement causes lever arms 39, through links 41 and 43 to move to the position shown in solid lines in Fig. 4. Such movement of lever arms 39 imparts the same movement to hollow arms 37 located adjacent each side of the links. Splines 38 transfer this movement to torsion bar 34 through splines 40 thereon. Torque to move cranks 29 is supplied through torsion bar 34 by the interaction of splines 35, 38. It should be noted that stops 84, 85 occupy substantially the same relative positiions throughout rotation of hollow arms 31, 37 during elevaion of surface 19'. The torsion bar suspension of truck 11 is such that cranks 29 can be deflected as the truck passes over an obstacle as illustrated in Fig. 3. This arrangement provides for movement of the load across an obstacle without substantial vertical movement thereof such that the power requirements of drive motor 27 is minimized and shifting of the load on the trucks is prevented. Furthermore, as shown in Fig. 3, the leading ground engaging track sections are curved upward so that the truck can easily climb an obstruction when moving in either direction.

When cranks 29 deflect, as when passing over obstacles, arms 31 and 37 move relative to each other and a point of deflection is reached where stops 84, 85 contact and limit further deflection of cranks 29 since the torque is transferred at this point directly to the over center linkage on acuator crank 45. This deflection tends to loosen track 21 on traction wheel 24, and to eliminate this tendency, idler crank 54 is provided. Considering this portion of the device, reference is made to Figs. 7, 8 and 9. With cranks 29 substantially horizontal, crank 54 is likewise horizontal as shown in Fig. 7 and if necessary, a stop may be provided to keep crank 54 from passing over center. In order to maintain proper tension in the tracks to compensate for minor variations in different tracks, plate 89 may be removed and a tool inserted in slot 88 to rotate eccentric 87 on arm 55. After the track is properly tensioned when in this position, eccentric 87 is locked in place by plate 89 and screws 90. Crank 54 moves from its position in Fig. 7 to substantially its position in Fig. 9 as cranks 29 elevate the truck. Deflection of crank 29 due to overloading and traversing obstacles causes movement of crank 54 to substantially its position in Fig. 8 at which time stops 84, 85 are in contact.

When power is applied to elevator motor 53 to raise the load, cranks 29 tend to rotate in bearings 32 thereby attempting to stretch the rack and create a tension therein. This track tension has a very small component acting normal to a line connecting the center of arm 55 with shaft 56, and is the only force available to cause movement of wheel 26 from its position in Fig. 7 to its position in Fig. 8. Such force, however, is sufficient to cause spring holders 60 to rotate through the interaction of key 59, and to cause a build-up of a force resisting this rotation as springs 63 are wound up. This latter force is utilized when the truck is lowered to return the idler to its position in Fig. 7 where idler wheel 26 is slightly above bogie wheels 25 to facilitate passage over obstacles when the truck is lowered. As key 59 contacts edge 69, further rotation of wheel 26 causes arm 64 to begin to pivot. Bell cranks 76 and arm 64 are interconnected by yoke 70 and bar 71 in such a manner that the moment of force about shaft 56 caused by compression springs 83 constantly varies as wheel 26 arcuately moves between its limits as shown in Figs. 8 and 9 to maintain belt tension at a constant value therebetween. Those skilled in the art recognize that this can be accomplished by straightforward kinematic analysis of the bell crank and connection arrangement. Thus, there is initially practically no resistance to movement of the idler (Fig. 7) since clock springs 63 are initially under practically no tension, and the idler easily moves from its position in Fig. 7 to its position in Fig. 8 as cranks 29 rotate and truck 11 is raised. During movement to the position in Fig. 9, the idler is under a variable load necessitated when it is considered that the angle formed by the track and idler wheel 26 varies as indicated by the arrows in Figs. 8 and 9. By maintaining the track tension constant during this latter range of idler wheel movement, track life is increased and traction efficiency is kept uniform regardless of the load on the truck.

Those skilled in the art will now fully appreciate that there is contributed a truck which can distribute the load being transported over a large enough area to reduce ground pressure to any reasonable value. It will further be appreciated that with this invention, each wheel of the suspension system is effectively powered and individually suspended, in order to readily pass over an obstacle with a minimum expenditure of power. In addition, this invention, in its idler, maintains the track in operative engagement with the traction wheel when the truck is both raised and lowered. While a crank and link arrangement is shown to actuate the bogie cranks, this is meant to be by way of illustration only and any equivalent arrangement could be used such as pneumatic cylinders or traveling nut. It is believed that the complete utility and value of this invention, as well as its great simplicity, will now be understood and appreciated by those skilled in the art.

We claim:

1. A cargo handling device of the type having a platform movable to different levels of elevation, ground engaging track means, a suspension and elevation system on said platform operable upon said track means for selectively moving said platform to said different levels, resilient means connecting said track means with said system, means to resiliently hold said platform at an upper elevation, and stop means to limit resilient movement between said track means and said system, characterized by the provision of track idler means for maintaining said track means in operative engagement with said suspension and elevation system during movement of said platform to all levels of elevation, comprising wheel means engaged with said track means and movable from a retracted position occupied when said platform is substantially at its lowest level to a fully extended position when said platform is substantially at its highest level, said wheel means being movable to an intermediate position when said platform is resiliently held at an intermediate level by said suspension and elevation system upon placing a load on said platform, first means responsive to elevation of said platform from said lowest level to substantially said intermediate level for holding said track means in operative engagement with said suspension and elevation system, and second means then made effective only throughout movement of said platform from said substantially intermediate level to substantially said highest level to maintain a constant track tension regardless of resilient movement between said track means and said system.

2. A cargo handling device as defined in claim 1 characterized further by providing on said first means, means to bias said wheel means toward retracted position during the time said first means is responsive to elevation of said platform, and by providing means to maintain this bias at substantially the same strength during the time said second means is effective.

3. A wheel suspension device for a vehicle comprising a pair of wheel arms mounted on said vehicle for rotation about a common axis, a vehicle supporting wheel rotatably mounted on each wheel arm, a resilient torsion bar having one end rigidly attached to one wheel arm and having the other end rigidly attached to the other wheel arm, the axis of said torsion bar being coincident with the common axis, crank arm means rigidly connected to said torsion bar intermediate the ends thereof, said crank arm means being rotatable between terminal positions to rotate the wheel arms between an extended position where the elevation of said vehicle from the ground is a maximum and a retracted position where the elevation of said vehicle from the ground is a minimum, over-center crank and link means connected to said crank arm means for maintaining the same in one terminal position corresponding to the extended position of said wheel arms, said wheel arms being resiliently rotatable toward retracted position when said crank arm means is in said one terminal position upon torsional deflection of said torsion bar, and means on said crank arm means engageable with said wheel arm means to limit such torsional deflection.

4. A tracked vehicle comprising a platform, a plurality of wheel cranks having one end pivotally mounted on the platform and having wheel means rotatable on the other end, said wheel means being engageable with the tracks, traction wheel means rotatably mounted on said platform for powering the tracks and moving the vehicle over the ground, actuating means torsionally connected to said cranks for rotating said wheel cranks, said actuating means being movable from an inoperative position where said wheel cranks are retracted and substantially parallel to the ground to an operative position where said wheel cranks are extended and inclined with respect to the ground, locking means to maintain said actuating means in operative position whereby said wheel cranks are resiliently rotatable with respect to the platform, characterized by the provision of a track tensioning device for maintaining said traction wheel in operative engagement with the tracks so that said traction wheel means is effective to power the tracks, comprising: an idler crank having one end rotatably mounted on said platform, said idler crank being rotatable from a retracted position where it is substantially parallel to the ground to a fully extended position where it is inclined with respect to the ground, idler wheel means rotatably mounted on the other end of said idler crank, spring means constantly urging said idler crank to retracted position, said spring means being operative to maintain said idler crank in retracted position with said idler wheel means in operative engagement with said tracks, said tracks causing rotation of said idler crank against said spring means when said wheel cranks are moved from retracted toward operative position, and auxiliary spring means stronger than said spring means for urging said idler crank to retracted position, said auxiliary spring means becoming effective only after said idler crank is moved from retracted position whereby said idler wheel means is maintained in operative engagement with said tracks while said wheel cranks are resiliently rotatable.

5. For use in lifting and transporting a load having an undersurface mounted on skids, a vehicle comprising a body having a load bearing surface, a plurality of wheel arms, one end of each arm being rotatably mounted on said body, a wheel rotatably mounted on the other end of each arm, said arms being rotatable on the body from a retracted position where said load bearing surface is adapted to pass between said skids and beneath said undersurface to an extended position where said load bearing surface is adapted to engage said undersurface and lift and support said load, endless track means engaged over the wheels for forming the only ground engaging portion of the vehicle when the arms are in either retracted or extended position, means to power said track means for moving the vehicle when the arms are in either retracted or extended position, an actuator crank associated with each wheel arm, the cranks being movably mounted on said body, means to move said cranks in one direction, resilient means interconnecting each wheel arm with its associated crank so that movement of the cranks in the one direction stresses the resilient means for applying torques to the wheel arms tending to rotate the same toward extended position against the weight of the load, and stop means rigidly connected to each wheel arm and associated crank, said stop means being spaced from each other when there is no stress in said resilient means but adapted to abut during movement of the wheel arms to extended position as the load is lifted and supported whereby the stress in the resilient means is limited to a value within the elastic limit of the resilient means.

6. For use in lifting and transporting a load having an undersurface mounted on skids, a vehicle comprising a body having a load bearing surface, a plurality of wheel arms, one end of each arm being rotatably mounted on said body, a wheel rotatably mounted on the other end of each arm, said arms being rotatable on the body from a retracted position where said load bearing surface is adapted to pass between said skids and beneath said undersurface to an extended position where said load bearing surface is adapted to engage said undersurface and lift and support said load, endless track means engaged over the wheels for forming the only ground engaging portion of the vehicle when the arms are in either retracted or extended position, means to power said track means for moving the vehicle when the arms are in either retracted or extended position, an actuator crank associated with each wheel arm, the cranks being rotatably mounted on said body, means to pivot said cranks from an inoperative position to an operative position, a torsion bar interconnecting each wheel arm with its associated crank, said cranks being at inoperative position when said wheel arms are at retracted position, rotation of said cranks toward operative position imparting rotation to said wheel arms toward extended position through the action of said torsion bars, the weight of the load being lifted by the vehicle causing said torsion bars to twist as the cranks rotate to operative position, and stop means rigidly connected to each arm and associated crank, said stop means being engageable before the twisting of the torsion bars exceeds the elastic limit thereof, continued rotation of said cranks after engagement of said stop means imparting movement to said arms through the stop means.

7. A wheel suspension device for a vehicle comprising elevator crank means adapted to be rotatably mounted on said vehicle, wheel arm means adapted to be rotatably mounted on said vehicle for rotation about an axis concentric with the axis about which said crank means is rotatable, wheel means rotatably mounted on said wheel arm means for rotation about an axis parallel to but spaced from the axis about which said crank means and said arm means are rotatable, torsion bar means interconnecting said crank means with said arm means so that rotation of said crank means imparts rotation to said arm means through torsional deformation of said bar means, first stop means rigidly connected to said crank means, second stop means rigidly connected to said arm means, said first and second stop means being spaced from each other when there is no torsional deformation but adapted to abut for limiting such torsional deformation.

References Cited in the file of this patent

UNITED STATES PATENTS

| | | |
|---|---|---|
| 1,857,468 | McGinness | May 10, 1932 |
| 2,158,457 | Kegresse | May 16, 1939 |
| 2,385,480 | Webster | Sept. 25, 1945 |
| 2,550,548 | Framhein | Apr. 24, 1951 |
| 2,587,624 | Johnson | Mar. 4, 1952 |
| 2,694,581 | Helmle | Nov. 16, 1954 |
| 2,860,715 | Bouffort | Nov. 18, 1958 |
| 2,877,981 | McMurry | Mar. 17, 1959 |

FOREIGN PATENTS

| | | |
|---|---|---|
| 623,360 | Germany | Dec. 19, 1935 |
| 1,037,500 | France | Apr. 29, 1953 |